United States Patent [19]

Preiss

[11] 3,863,225

[45] Jan. 28, 1975

[54] PRIORITY CONTROLLED SELECTION OF DATA SETS IN A DATA PROCESSING SYSTEM

[75] Inventor: Gunter Preiss, Paderborn-Wewer, Germany

[73] Assignee: Nixdorf Computer AG, Paderborn, Germany

[22] Filed: Feb. 27, 1973

[21] Appl. No.: 336,326

[52] U.S. Cl. .............................................. 340/172.5
[51] Int. Cl. .......................... G06b 11/32, G06f 9/18
[58] Field of Search .............. 340/172.5; 179/15 AL

[56] References Cited

UNITED STATES PATENTS

| | | | |
|---|---|---|---|
| 3,534,339 | 10/1970 | Rosenblatt | 340/172.5 |
| 3,638,198 | 1/1972 | Balogh, Jr. | 340/172.5 |
| 3,680,053 | 7/1972 | Cotton et al. | 340/172.5 |
| 3,710,351 | 1/1973 | Nakamura | 340/172.5 |

*Primary Examiner*—Paul J. Henon
*Assistant Examiner*—Michael Sachs
*Attorney, Agent, or Firm*—Hauke, Gifford, Patalidis & Dumont

[57] ABSTRACT

A method of control of a data processing system whereby priority-controlled selection of one of a plurality of functional units with different connection priorities and which may be simultaneously signalling requests for connection to a common processor allocated thereto is effected by allocating to each functional unit a unique request signal for connecting that unit to the common processor with the request signal identifying the degree of priority of that unit and by providing means comparing and selecting the request signal having the highest priority where several request signals are being received by the common processor.

19 Claims, 3 Drawing Figures

PRIORITY CONTROLLED SELECTION OF DATA SETS IN A DATA PROCESSING SYSTEM

BACKGROUND OF THE INVENTION

This invention relates to methods and apparatus for control of data processing systems and has for its object to provide improved methods and apparatus whereby priority controlled selection of one of a plurality of functional units with different connection priorities and which may be simultaneously signalling requests for connection to a common processor allocated thereto, is effected.

The requirement which the attainment of this object would meet often arises in data processing systems — namely the requirement of maintaining a predetermined sequence of connection providing access to a processor allocated in common to a plurality of functional units which make request signals for connection. Thus, for example, a data processing system may include an internal store to which various functional units constituted by data processing terminal equipment items, such, for example, as a printer, an information transmission device, a data display device or some other marginal or peripheral units, are required to be connected. If a plurality of such functional units simultaneously signal a request for connection to the internal store simultaneously it is necessary, in order to preserve the predetermined connection sequence, to ensure that, irrespective of the number making a request signal at any given time, the units are connected to the central processor (the internal store, in this particular case) in the required predetermined sequence so that the procedure follows the predetermined order of priority. A similar requirement arises in other cases, for example, in the signalling of "interrupts" to a computer.

Hitherto, in order to satisfy the requirement to preserve the predetermined order of priority one or the other of two procedural principles, or types of control circuit, have been employed. The common feature in both has been that the predetermined order of priority is established by the type of interconnection of the individual functional units, this order or priority also allowing for an interrogation function, which in a sequence of interrogation of the individual units can determine their priority sequence. Thus, for example, in a system employing the first of these known procedural principles and having central priority control, there would be provided at least one signalling line to the central processor from each functional unit which is to be connected to a central processor but which has also to be incorporated in the priority control system. These signalling lines are provided specially for the purpose of priority control, irrespective of how each unit may be connected to the central processor as regards information signal transmission and handling. There is, therefore, central evaluation of the priority of the various functional units since (for priority purposes) they are all connected with the central processor each by its own special "priority" line. There is also provided a central priority circuit the purpose of which is to decide, in accordance with a predetermined control logic, which out of a number of functional units which may be simultaneously signalling requests for connection to the central processor, should be given priority for such connection, or which functional units which may already have been connected thereto, should be disconnected again. The control logic is also designed to be able to respond appropriately if only one unit has signalled a request for connection and to ensure connection of this unit to the central processor without interrogating any other unit, thereby speeding up the priority control procedure to some extent. It will be appreciated, however, that a further group of signalling lines is needed namely at least one signalling line from the priority circuit to the functional unit which is connected at any given time. These further lines are necessary because a "starting" signal has to be sent to the functional unit which is ultimately selected and connected so that, finally, operative communication can be established between the functional unit in question and the central processor. It will be seen, therefore, that systems employing the above described known procedural principle, such a system may be termed a central priority system has the serious practical disadvantage of requiring costly extra signalling lines purely for priority control between each functional unit and the central processor. These lines are additional to those provided for data signal transmission.

The second known procedural principle of priority control may be called the "chain" principle. In systems employing this principle the functional units connected to a central processor are series-connected in a chain in respect of their order of priority. When one functional unit, or several simultaneously, signal a request for connection, a special priority signal is switched forward in steps from the first functional unit in the chain to the last one. In this process, depending on the existing priority of the functional units through which a priority signal has already passed, either a "go" or a "no go" signal is passed on to the next functional unit concerned which, if necessary is linked with the connection request of the preceding functional unit. A clock signal must also be generated for use in the circuits of all the functional units in order to create an interval of time during which conditions in the circuit chain can be stabilized, so that after a predetermined period no further request for connection which may appear within the chain is evaluated. At the end of the interval determined by the clock signal, the functional unit of highest priority is finally selected. The finally selected unit may be anywhere in the chain, near the front or near the rear of the chain, or intermediately among those which have signalled a request for connection. The chain process has the disadvantage that the order of priority of the functional units is fixed by the circuit of the chain. Also the determination of priority among the several functional units cannot be effected at one time, because the functional units are interrogated successively. The process of priority control is therefore a relatively slow one.

The two known procedural principles above described have the common disadvantage that the extent and design of the control circuits necessary to carry them out in any given data processing system are fixed by the extent and nature of that system and it is not possible, after installation, to expand the data processing system without special additional expense arising from necessary changes and/or expansion of the priority control parts of the installation. It would be a very considerable practical advantage to have a priority control system which would allow some possibility of development or expansion of a data processing system without the necessity for interfering with central processing devices or extension of connection lines.

The present invention seeks to avoid or reduce the disadvantages above described of the known priority control systems.

SUMMARY OF THE INVENTION

The method of the invention enables all the functional units to be connected in parallel to the central processor without providing a central interrogation function as is necessary in the case of parallel connection of functional units in known systems. Accordingly, with this invention, it is possible, after installation, to extend a data processing system in any desired manner though it is only possible to extend functional units disposed after one another, in accordance with their order of priority where necessary, but connected in parallel by further functional units which are to be connected to the common communications path. If for each functional unit there is provided a special priority criterion signal, permanently allocated to it, which is fed into the common communications path as indicated, a "state" is produced on the common communications path by the priority criterion signals fed in from those functional units which have signalled a request for connection. The value of the "state" (hereinafter so termed) includes the values of the individual criterion signals. As a result, however, this state has a value which is composed of the highest values of fed-in criterion signals occurring per value position in each case and the place number of which coincides with that of the criterion signal fed in, or corresponds to the greatest occurring place number of these criterion signals. If, now each functional unit which is connected to the communications path and is signalling a request for connection carries out a comparison between the value of the state on the communications path and the value of the criterion signal allocated to itself, it is possible, by the resultant of comparison to determine whether or not there is another functional unit with higher priority connected to the common communications path. In this way, in a single step, the criterion signals of the signalling functional units can be fed on to the common communications path and, by a process of comparison, it can be established whether any, and if so which, of the connected functional units must be disconnected to maintain priority. Disconnections may be obtained automatically at the unit or by central control. Only a functional unit which has the highest priority within the sequence of priority of the units signalling requests for connection remains connected to the common communications path.

There are various ways of carrying out the invention, the different ways having different degrees of advantage as regards cost, speed of action and dependability. Thus in carrying out the invention there may be employed for the criterion signals indicating the degree of priority of connection entitlement, a fixed, predetermined number in each case with a value proportional to the degree of priority. The necessary signal comparisons may be made simultaneously as regards all the functional units, and disconnection of lower priority functional units made after a comparison period which is the same for all functional units and is set by a signal which is common to all the functional units and is provided from the central processor or from one of the units. Disconnection is inhibited as regards the functional unit in which the result of comparison is of zero value.

Because a fixed, predetermined number is used as the priority criterion for each functional unit, the number having a value proportional to the degree of priority, there occurs, on the common communications path when criteria are fed in thereto, a state which, as regards its value, or the value at its position of maximum value, corresponds to the value of the criterion on the functional unit of highest priority connected at any given time. The selection can then take place as indicated, by a process of comparison which is carried out simultaneously for all functional units. For this purpose a comparison signal may be transmitted from the common processor or from one of the functional units and this signal can be transmitted over the common communications path as a special control signal or it can be transmitted, if suitable clock control signals are provided, as a counting signal. If comparison is made simultaneously for all the functional units, a comparison result of zero is produced (in one comparison step) in the functional unit of highest priority, the remaining functional units giving comparison results of other zero value. If criteria with several places are used, zero comparison value will appear already for the highest value position in the same way during the comparison procedure within the scope of comparison by position. Since the degree of priority is indicated by a number proportional to it, it is impossible, if the criteria are suitably distributed, for any numbers with coinciding highest values to be present. Therefore zero comparison value can occur only for the highest value position of the comparison result and the functional unit of highest priority (of those requesting connection) remains uniquely connected to the common communications path, all other functional units feeding in signals being disconnected from that path. In order that the value of the state produced on the common communications path by the signalling functional units shall not alter through non-uniform disconnections and the disconnection criterion shall be maintained for all the signalling functional units except one, the disconnection of those functional units which are to be disconnected is effected after the lapse of a comparison period which is the same for all the functional units.

In a further development of the last described way of carrying out the invention, the disconnection of functional units from the common communications path is effected by means of a disconnecting signal transmitted from the common processor to all the functional units simultaneously. This ensures that the disconnection of those functional units which have to be disconnected is carried out simultaneously. However, in a modification which involves somewhat lower cost than is involved in providing for the generation of a disconnecting signal at the common processor, disconnection is effected by a disconnection command signal generated individually in each functional unit after the comparison period has expired. The expiry of the comparison period can be measured in each functional unit by a clock signal common to all the units or by means of suitable time control circuits. Circuits and devices for securing switching operations after a certain time are too well known to require description here.

The invention can also be carried out by using for the criterion indicating the degree of priority of connection entitlement, a fixed, predetermined number and its complement in each case; by carrying out positional comparison of the state produced on the communications path for the number and for its complement; and by selecting the functional unit of highest priority in dependence on the level of the difference between the two comparison results obtained from the respective comparisons of the value of the number and of that of its complement.

This way of carrying out the invention is especially advantageous when the criteria signals employed are code characters of the type used in many data processing systems. If identification numbers are provided as the criteria for the functional units and these are fed on to the common communications path in response to a request for connection, a value state appears on the common communications path. This value is determined by the individual identification numbers and is composed of the highest existing values of each position. Now, if, simultaneously with the respective value of the identification number, the corresponding complement is also fed on to the common communications path, the need for special, precisely timed control of the comparison operation and of the disconnection operation is avoided, with the result that the cost of the apparatus provided for priority selection is still further reduced. The difference between the comparison results for the respective value and the respective complement is produced. The magnitude of this difference in each signalling functional unit determines whether other units of higher priority have been connected to the common communications path, or have fed their priority criterion signal into it.

There will now be given, in more detail, an explanation of those inter-relations which are relevant to an understanding of a priority control system in accordance with this invention. In the description which follows it will be assumed that there are $n$ functional units capable of being connected to a processor which is allocated to them all in common, and that their identification numbers for priority selection form the sequence $a, b, \ldots n$. If these identification numbers have different values which rise or fall in conformity with a predetermined priority arrangement, then it is possible in general to start with the value order $$a < b \ldots < n$$

for the functional units. If these values are fed on to the common communications path, together with the associated complements, and it is assumed that this occurs in all the functional units, then the following criteria signals will be fed into the common communications path:

$$a < b < \ldots < n$$

$$(k - a) > (k - b) > \ldots > (k - n)$$

where $k$ is the basic value of the number system employed and from which the respective individual value $a, b, \ldots n$ must be subtracted in order to produce the respective associated complements. These criteria produce a value and complement state on the common communications path which, in the manner described is determined by the highest value per position at any given time. Thus, in a continuation of the aforementioned general representation, the two partial states so produced have the values $n$ for the values fed in $(k-m)$ for the complements fed in. Since in accordance with the assumption that all the functional units considered have fed in their criteria to the common communications path, the following comparison figures are obtained for the functional units:

| Functional unit: | a | b | ... | n |
|---|---|---|---|---|
| "Value" comparison | $(n-a)$ | $(n-b)$ | ... | 0 |
| "Complement" comparison | 0 | $(b-a)$ | ... | $(n-a)$ |

Now if in each case the difference between these comparison figures is formed in the same sense for all the functional units there is obtained a difference value for example for the functional unit $a$ which is greater than zero, whereas the difference value for the function unit $n$ is less than zero.

If numbers of more than one place are employed for the individual criteria, the various places of such numbers naturally participate in the establishment of the state on the common communications path. Then, by comparison with the aforementioned single place approach, with numbers of $m$ places, the following state would arise for $n$ functional units:

$(n_m; n_1; \ldots n_1) + q$ — for the values fed in.

$(k - a_m; k - a_1; \ldots k - a_1) + r$ — for the complements fed in.

Here $q$ and $r$ are those complements which result through the additional places of the criteria of functional units other than those considered here. These complements accordingly affect only the position values 1 to 1. In the execution of the comparison operation the following comparison figures are obtained for the functional units $a$ and $n$:

| Functional units: | $a$ | $n$ |
|---|---|---|
| "Value" comparison | $(n_m-a_m; n_1-a_1; \ldots n_1-a_1)+q$ | $p$ |
| "Complement" comparison | $r$ | $(n_m-a_m; n_1-a_1; \ldots n_1-a_1)+r$ |

From the above definition of the components $p$ and $r$ it follows in general, for identification numbers of more than one place, that the differences between the comparison figures for the units $a$ and $n$ have opposite signs, since the value for $r$ and $q$ is in each case less than the value of the term in brackets which is linked respectively therewith. This applies in general for any sequences of identification numbers $a, b \ldots n$, and therefore also for some values selected at random from continuous sequences, as may be the case in a priority control system in accordance with the invention.

From the immediately preceding description, it will be seen that if the criteria signals fed in to the common communications path from $n$ functional units consist of values and their complements, the results of the comparison operation at any functional unit will indicate, by the sign of the difference produced by the comparison, whether or not some other functional units with higher priority has fed its priority criterion signal on to the common communications path. If, for example, the functional unit $a$ with the identification number of lowest value has the highest priority, then on subtraction of the "complement" comparison value from the "value" comparison value, a difference with a positive sign appears. Thus those functional units in which the "complement" comparison value is greater than the 'value" comparison value can be disconnected from the common communications path. This requires no special disconnecting signal, precisely defined in respect of time, for the processor which is allocated in common.

With certain forms of representation of the various identification numbers it is possible also to provide for several functional units values such that, although they are different, they nevertheless have coinciding digits in their positions of highest value. As a result it may occur, during the comparison process, that there will appear in several functional units comparison values with coinciding signs. This involves maintenance of the connection of these functional units with the common communications path. Disconnection of the remaining functional units is then linked with a change in the value of the state produced on the common communications path by the functional units which still remain. This again leads to new comparison values of the nature generally described above and which brings about the disconnection of further functional units. The processes of comparison and disconnection are repeated automatically until finally only one single functional unit remains connected to the communications path, that one being one with regard to which the difference between the two comparison values is zero.

In all the ways, above described, of carrying out the invention, the criterion signals indicating priority of connection entitlement may, if desired, be stored by storage means provided at the functional units and may be arranged to be fed on to the common communications path in response to a feeding-in command signal from the processor. Storage equipment for storing the criterion signals may thus be located at the functional units themselves. This is of advantage in data processing systems in which extension of the system after installation is likely to be required. The common communications path can also be utilized for transmitting the request signals for connection and/or for transmitting the feeding-in signals, so that the true information data signal carrying lines from the functional units to the common processor are not loaded by criterion signals required for priority control.

An advantage common to all the above described ways of carrying out the invention is that it is conveniently simple to modify the control in the respective functional units to permit, for example, special inhibiting measures. Thus, for example, an inhibiting criterion signal can be fed from the common processor on to the common communications path and stored in the functional units and, in conjunction with an inhibiting signal given to a control line of the common communications path, used to produce inhibition of those functional units for which the priority criterion signals indicate, for example, a lower priority than is characterized by the inhibiting criterion signal itself. As a result inhibition of certain functional units can be effected after final connection of a selected functional unit so that a functional unit which has once been connected cannot be disconnected again by units with lower priority, for example.

BRIEF DESCRIPTION OF THE DRAWINGS

The invention is further described and explained with reference to the accompanying drawings which relate to an embodiment in which there is simultaneous feeding-in of the values and complements of priority criterion signals with binary, three-place representation of the priority criteria. In the drawings.

DESCRIPTION OF THE PREFERRED EMBODIMENT

Figure 1:
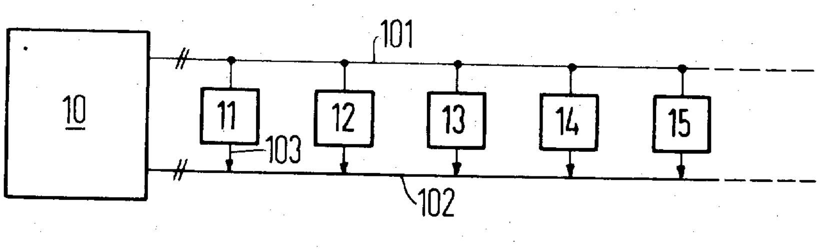
FIG. 1 is a diagrammatic general representation showing several functional units which can be connected parallel to a communications path to a processor allocated in common.

The data processing system represented in FIG. 1 comprises a superior processor 10 and functional units 11, 12, 13, 14, 15, . . . and so on which can be connected thereto. The functional units can be connected to the superior processor 10, which may be an internal store or a computer, for example, by way of a communications path which is common to them all, the communications path being made up of the lines 101, 102. The lines 101 may be used for information data communication with the superior processor 10 and the lines 102 as control lines for priority control. The functional units 11, 12, 111 and so on are connected to the control lines 102 by linking lines such as 103 and each transmits priority criterion signals over one of these lines to the priority control on the common communications path at a time when it is signalled a request for connection and a "starting" command to this effect has been given from the superior processor 10. It will be noted that all the functional units 11, 12, . . . and so on can be connected to the superior processor 10 in parallel with one another and that the common communications path is made up with the lines 101 and 102 in the manner of a so-called party-line. Thus any number of functional units 11, 12, . . . and so on can be allocated to the superior processor so that an extension of an already existing system can easily be carried out by connecting the additional functional units on to the already existing "last" functional unit when the common communications path is taken through the individual units.

Figure 2:
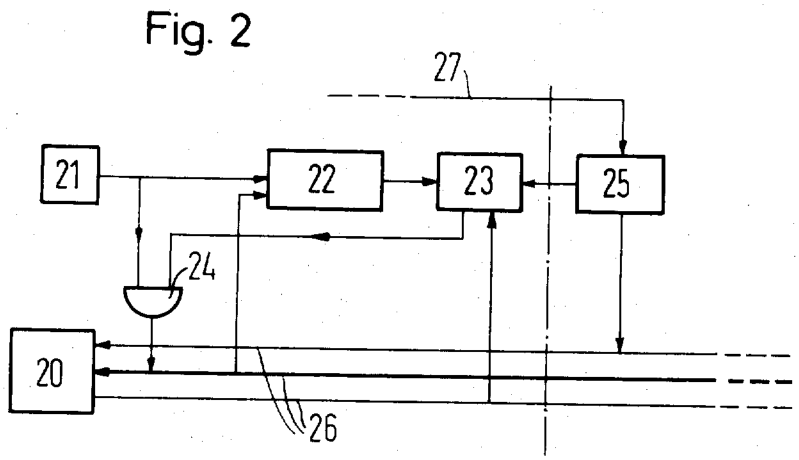
FIG. 2 is a diagrammatic representation of the priority control arrangement in one of the functional units.

FIG. 2 is a functional block diagram of a priority control apparatus at one of the functional units which can be connected to the superior processor 20 by way of the common communications path which is referenced 26 in FIG. 2. Reference numeral 21 denotes a store in which the priority criterion signal provided for this particular functional unit is permanently stored. This store 21 is appropriate to this functional unit. Reference numeral 25 denotes a clock signal generator source. It may be appropriate to one functional unit only (in FIG. 2, that shown) or it may be provided elsewhere in a special control unit or at the superior processor. This possibility is indicated by the separating chain line.

When there is a connection request for the functional unit shown in FIG. 2, a corresponding signal is generated on a control line 27 for the clock generator 25 and the latter is actuated so that a request for connection is transmitted by a synchronized announcement signal on to the common communications path 26. This signal arrives in the superior processor 20 where it generates a feedback signal (depending on its manner of operation) which is passed via the common communcations path 26 to the functional unit shown and also to such further functional units which have been announced. The feedback signal actuates a time-controlled control circuit 23. An exemplary control circuit is shown in Kintner, Paul M., Electronic Digital Techniques, published by McGraw-Hill Book Company, 1968, at page 255. Upon actuation the information in the store 21 appears at the first input of a gate 24 and of a comparator 22. The gate 24 is opened by the control circuit 23 of the feedback signal from the superior processor 20, and the priority criterion signal is fed on to the common communications path 26 by this criterion signal and also by the criteria signals of other functional units triggers the second input of the comparator 22. Here comparison is made of the priority criterion signal from the store 21 with the state produced on the common communications path 26. The resultant of comparison controls the control circuit 23 causing it, in dependence on the result of the comparison, either to disconnect the functional unit from the common communications path 26 or leave it connected thereto. This connection or disconnection can only be effected in respect of the data information lines or for the control lines; the details of the connection and disconnection circuitry are not shown since they form per se no part of the priority control system of this invention.

Figure 3:
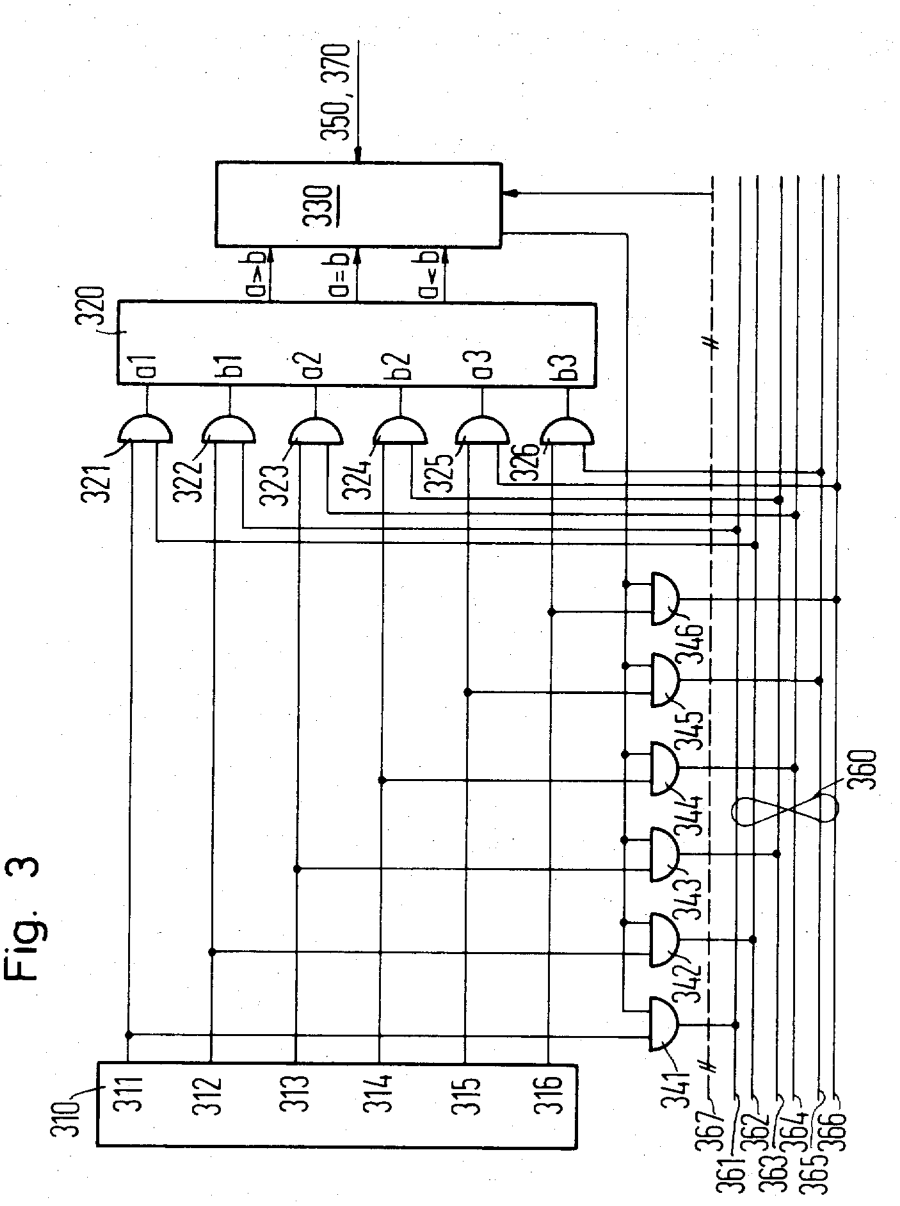
FIG. 3 is a diagram of the circuitry of the arrangement shown in FIG. 2 for the case in which three-place binary criterion signals are used.

In FIG. 3 the circuitry of the control arrangement of FIG. 2 is represented in greater detail. The arrangement is that of a priority control system using three-place binary members as priority criterion signals. For the particular functional unit being considered there is a store, referenced 310 in FIG. 3, in which the binary number allocated to the functional unit is permanently stored. This store has two outputs for each digit. In reading out, one of these outputs gives the digit value and the other the complement thereof. Thus, for example the outputs 311, 313, 315 may be the "value outputs" and the outputs 312, 314, 316 the "complement outputs." Each of the outputs 311 to 316 is connected in each case with the first input of one or other of the gates 341 to 346. The gates 341 to 346 can be opened by a signal from the control circuit here referenced 330. This control circuit can be controlled by a clock circuit signal fed in at 350, or by a starting control signal fed in at 370 and also by way of control lines 367 of the common communications path 360, can exchange control signals with the superior processor (not shown in FIG. 3). The outputs of the gates 341 to 346 are in each case carried on to one or other of the lines 361 to 366 of the common communications path. These lines 361 to 366 are allocated to the outputs 311 to 316 of the store 310 in such a way that the lines 361, 363, 365 are "value lines" and the lines 362, 364, 366 are "complement lines." Each of the lines 361 to 366 is further connected with a second input of one or other of the gates 321 to 326, respectively, so that the state produced on the common communications path 360 by several functional units together, in conjunction with the identification number read out from the store 310 for each position of the numerical system employed in respect of value and complement, appears at the gates 321 to 326. The output signals ***a*1, *b*1, *a*2, *b*2, *a*3, *b*3 of the gates 321 to 326 arrive at the comparator 320 in which they are compared with one another and the outputs of which give a control signal which, in dependence on the magnitude and sign of the respective difference between the priority criterion signal and the state of the line, provides a criterion for deciding whether to disconnect this functional unit from the common communications path 360 or ultimately leaving it connected. This criterion is evaluated by means of the control circuit 330 which can trigger the necessary switching processes in the formation lines to the superior processor - not shown. The comparator 320 operates to determine whether $(a1.2^0 + a2.2^1 + \ldots + an.\ 2^{n-1}) - (b1.2^0 + b2.2^1 + \ldots + bn.2^{n-1})$ is less than, equal to or greater than 0. An exemplary comparator circuit is shown in the above cited Kintner text on page 22. For carrying out comparison directly by position it would actually be necessary to provide six comparators in the circuit arrangement shown in FIG. 3. This would be expensive, especially in circuit wiring. However, the comparison result necessary for orderly priority control is obtained with substantially less circuit complication and cost by means of the illustrated arrangement of the gates 321 to 326 and the single true comparator 320 since, in this case, there is a special type of triggering, now to be described, of the whole comparison circuit which is composed of the gates 321 to 326 and the comparator 320. The two respective inputs of the gates 321 to 326 are connected on the one hand with one of the outputs 311 to 316 of the store 310 and on the other hand with one of the lines 361 to 366. The connections are such that one input of the respective gate is triggered by a "value" and the other input by a "complement." This type of triggering of the gates 321 to 326 yields output signals which, for each position of the priority criterion, identify any difference, in respect of value and complement, between the state of the respective position of the priority criterion and the state of the corresponding line of the common communications path by a binary "1," so that the comparator 320** can evaluate these differences which occur by position as comparison values for difference formation.

A good starting point for consideration of the illustrated comparison circuit is that there is produced on the common communications path 360 a state which, for the values and the complements, corresponds to an OR-operation of the priority criteria fed on to it, whereas the respective store 310 provides the priority criterion as true value and complement magnitude. This means that, irrespective of the state of the common communications path 360, the value produced on each of its lines 361 to 366 is always greater than or equal to the value which is supplied by the output 311 to 316 of the store 310 which is connected at any given time by way of one of the gates 341 to 346. A difference between the two values, which requires further evaluation, is thus present when — and only when — the respective line of the common communications path is already carrying a binary "1" and the output of the store 310 connected to it reads out a binary "0." One form of circuit which will identify this difference with a binary "1" is an EXCLUSIVE-OR circuit. However in the circuit shown in FIG. 3 simple AND gates 321 to 326 are used, one input of which is in each case connected with a store output 311 to 316 which gives the inversion of the partial criterion which is actually to be evaluated. Thus, for example, the AND gate 322 is triggered with the "value" state of the line 361 and with the "complement" state of the store putput 312 for the first criterion position. If this position has the binary state "0" at the store output 311 but the line 361

ɪas the binary state "1," then a binary "1" appears at the output of the AND gate 322 as a signal *b*1. Similar operations occur in the remainder of the comparison circuitry. Naturally this circuit principle is not restricted to use with the three-positional binary representation of the priority criterion which has been assumed above but is applicable in generally similar manner when other types of representation and place numbers are used.

An example of operation of automatic priority selection by a control system as illustrated by FIG. 3 will now be described. In the particular case to be described it will be assumed that there are eight different functional units (numbered for reference purposes 1 to 8) with the binary three-place identification numbers 000 to 111 and that the lower the value of the identification number the higher the priority.

Suppose for example, that the functional units 3, 4, 5 and 7 feed their identification numbers 011, 100, 101 and 111 on to the common communications path 360. These values appear at the outputs 311, 313, 315 of the store 310 and at the first inputs of the gates 321, 323, 325 and 341, 343, 345. As the result of an appropriate signal from the control circuit 330 these values are passed to the lines 361, 363, 365, producing a "1" on lines 361, 363 and 365 and so that the value 111 appears on these lines taken together. The complements 100, 011, 010 and 000 appearing at the outputs 312, 314, 316 of the store 310 are fed to the gates 322, 324, 326 and 342, 344, 346 and similarly produce the value 111 on the lines 362, 364 and 366 of the common communications path.

The binary states now on the lines 361 to 366 cause the gates 321 to 326 to open so that the respective identification number and its complement for each announced functional unit are fed in to the comparator 320 and there compared with the two states of the common communications path 360 for the values and the complements. The result is shown in tabular form below on the assumption (already stated) that functional units 3, 4, 5 and 7 are the announced units, i.e., the units requesting connection to the data processor:

| Functional unit: | 3 | 4 | 5 | 7 |
|---|---|---|---|---|
| Identification number | 011 | 100 | 101 | 111 |
| Complement | 100 | 011 | 010 | 000 |
| "Value" line state | | 111 | | |
| "Complement" line state | | 111 | | |
| "Value" comparison | 100 | 011 | 010 | 000 |
| "Complement" comparison | 011 | 100 | 101 | 111 |
| Signal from store 320 | $a>b$ | $a>b$ | $a<b$ | $a<b$ |

Because the difference formed from the respective two comparison values is greater than zero in the case of functional unit 3 only, this functional unit remains connected to the common communications path 360, whereas the "criterion difference" — less than zero — in the functional units 4, 5 and 7 causes them to be automatically disconnected from the path 360. This is effected, in any convenient manner (not illustrated) known per se, by the control circuit 330 which is arranged (also in known manner, not illustrated) to respond, as indicated to the signals, "$a < b$" and "$a < b$." For the finally remaining functional unit the binary state on the common communications path 360 coincides with the priority criterion stored in this functional unit so that the signal "$a = b$" from the comparator 320 is the criterion for the continued connection of the functional unit 3.

An automatic second-stage priority control results for example in the case of an announcement signal from the functional units 1, 3, 5 and 6. The following table shows, in the same way as before, the steps involved:

| Functional unit | 1 | 3 | 5 | 6 |
|---|---|---|---|---|
| Identification number | 001 | 011 | 101 | 110 |
| Complement | 110 | 100 | 010 | 001 |
| "Value" line state | | 111 | | |
| "Complement" line state | | 111 | | |
| "Value" comparison | 110 | 100 | 010 | 001 |
| "Complement" comparison | 001 | 011 | 101 | 110 |
| Signal from 320 | $a>b$ | $a>b$ | $a<b$ | $a<b$ |

The functional units 5 and 6 are disconnected automatically from the common communications path 360 because, for them, *a b*. The remaining functional units 1 and 3 then produce the following binary states:

| Functional unit: | 1 | 3 |
|---|---|---|
| Identification number | 001 | 011 |
| Complement | 110 | 100 |
| "Value" line state | 011 | |
| "Complement" line state | 110 | |
| "Value" comparison | 010 | 000 |
| "Complement" comparison | 000 | 010 |
| Signal from 320 | $a>b$ | $a<b$ |

After this second step, after disconnection of the functional unit 3 (because for this unit, $a < b$) functional unit 1 remains connected to the common communications path 360 and the comparator 320 then generates the signal "$a = b$."

The above described process can be carried out in the same way with decimal numbers having any number of places. Irrespective of the number of stps involved in the priority control the resultant of equality of the two comparison values is obtained only as regards the functional unit of highest priority (at any time). This state (value of the result of comparison equals zero) can be evaluated and used as the criterion either for initiation of the operating cycle, or establishing communication with the processor which is allocated in common.

Although, in the preceding description, it was assumed that the highest degree of priority was allocated to the functional unit which (at any given time) has the lowest identification number, this is obviously not essential and highest priority could equally well be allocated to the unit with the highest identification number.

Similar results can be obtained if the circuit arrangement of FIG. 3 is modified by replacing AND gates 321, 322, 323, 324, 325 and 326 by NOR gates and the AND gates 341, 342, 343, 344, 345 and 346 by NAND gates. In this case the second inputs of the NOR gates are in each case applied to the value, or complement line respectively on to which the value present at the first input of this NOR gate is also fed through one of the NAND gates. This will be apparent at once if it is remembered that, irrespective of the state of the common communications path 360, the value produced on each of its lines 361 to 366 is always greater than or equal to the value provided from the store output 311 to 316 which is connected at any given time through one of the gates 341 to 346, and that a difference between the two values to be compared will be present when — and only when — the relevant line of the common communications path is already carrying a binary "0" and the output of the store 310 connected to it reads out a binary "1."

What I claim is:

1. A method of control of a data processing system whereby priority-controlled selection of one of a plurality of functional units with different connection priorities and which may be simultaneously signalling requests for connection to a common processor allocated thereto is effected, said method including allocating to each functional unit a priority criterion signal for connection of that unit to said common processor, each such signal being of peculiar value to the unit to which it is allocated and identifying the degree of priority of said unit; feeding into a common communication path leading in parallel from all the functional units to the common processor, priority criterion signals from those functional units which are at the time requesting connection; comparing the value of the priority criterion signal allocated to each requesting functional unit with the total value produced by the composite of the signals present on said path from all requesting functional units; and in dependence upon the result of comparison being equal to or different from a predetermined value for each functional unit selecting for connection with that functional unit which, at the time, is of the highest priority upon an equal comparison, and by disconnecting simultaneously requesting functional units of lower priority for which the result of the comparison is different from the predetermined value.

2. The method as defined in claim 1 and in which the comparison of the value of the priority criterion signal with the total value produced by the signals present on said path is effected at each requesting functional unit.

3. The method as claimed in claim 1 wherein the value of the priority criterion signal allocated to any functional unit is a signal identifying the degree of priority of said functional unit by a fixed, predetermined number, signal comparisons being carried out simultaneously at all the requesting functional units in response to a comparison command signal transmitted to all the units in common and provided from the processor or from a functional unit, and disconnection of functional units having a priority less than the functional unit having the highest priority being effected after a comparison period which is the same for all the functional units, connection being established or continued as regards that functional unit for which the result of comparison is zero.

4. A method as claimed in claim 3 wherein the disconnection is effected by a disconnecting command signal which is provided from the processor, and transmitted simultaneously to all functional units in common.

5. A method as claimed in claim 3 wherein the disconnection is effected by a disconnecting command signal generated individually in each functional unit after the end of the comparison period.

6. A method as claimed in claim 1 wherein the value of priority criterion signal allocated to any functional unit is a signal identifying the degree of priority thereof by a fixed predetermined number and its complement, signal comparisons by position or order of magnitude of the state produced on the common communications path being carried out both as regards these numbers and their complements and selection of connection being effected in dependence on the difference between the two comparisons results obtained, one for the value of the number and the other for the value of the complement.

7. A method as claimed in claim 6 wherein the value of the priority criterion signal is a binary signal and wherein signal comparison is effected for each binary bit by AND-gating the binary state of the common communications path associated with that binary bit with the complement of the corresponding binary bit of the predetermined number and determining the difference between the gating signals for the value of the number and the value of the complement.

8. A method as claimed in claim 6 wherein the selection is effected in dependence on the sign of the said difference.

9. A method as claimed in claim 1 wherein the value of the priority criterion signal allocated to any functional unit and identifying the degree of priority thereof is stored in a store adjacent to that functional unit and fed therefrom into the common communications path in response to a feed-in command signal from the common processor.

10. A method as claimed in claim 9 wherein the value of the priority criterion signals for connection and the feed-in command signals are fed over the common communications path.

11. The method as defined in claim 1 in which the comparison of the value of the priority criterion signal from the requesting functional unit with the total value of the signals present on said path further comprises the steps of feeding into said common communication path the complement of said value of the priority criterion signals from those functional units which are at the time requesting connection; combining said value of the priority criterion signal of said functional unit with the states on the lines associated with said value of the priority criterion signal of said common communication path to obtain a first comparison number; combining said value of the complement of said priority criterion signal of said functional unit with the states on the lines associated with the value of the complement of said priority criterion signal of said common communication path to obtain a second comparison number; comparing said first comparison number with said second comparison number for selecting for connection the requesting functional unit with the highest priority number and disconnecting requesting functional units with lower priority numbers.

12. The method as defined in claim 11 in which said value of the priority criterion signals are binary coded.

13. The method as claimed in claim 12 in which the steps of combining said binary priority criterion signal, and the complement of said binary priority criterion signal, with the binary states on their respective associated lines on the common communication path, comprises the step of exclusive-or gating said binary priority criterion signal, and the complement of said binary priority criterion signal, with the binary states on their respective associated lines on the common communications path.

14. Apparatus for control of a data processing system whereby priority-controlled selection of one of a plurality of functional units with different connection priorites and which may be simultaneously signalling requests for connection to a common processor allocated thereto is effected, said apparatus including means allocating to each functional unit a value of a priority criterion signal for connection of that unit to said common processor, each such signal being peculiar to the unit to which it is allocated and identifying the degree of priority of said unit; means feeding into a common communication path leading in parallel from all the functional units to the common processor the value of the priority criterion signals and the value of the complement priority criterion signals from those functional units which are, at the time, requesting connection; means comparing the value of the priority criterion signal and the value of the complement priority criterion signal of each functional unit with the total value produced by the composite of the signals present on said path from other functional units and in dependence upon the result of said comparisons being equal to or different from a predetermined value for each functional unit, means for selecting for connection that functional unit, which, at the time, is of highest priority upon an equal comparison, and by disconnecting those functional units of lower priority in which the result of the comparison is different from the predetermined value.

15. The invention as defined in claim 14 wherein the value of the priority criterion signals identifying the priorities are in the form of binary numbers, said apparatus further including at each functional unit, two first gates provided for each position of the binary number allocated to that functional unit; means for applying as the first inputs to said gates the value, or complement of the associated binary bit of the binary number allocated to the funational unit; means for applying as the second inputs to said gates signals present on value, or complement lines of the common communication path for this bit position; and means for feeding the outputs of the gates respectively to the two control inputs of a multibit binary comparator.

16. The apparatus as defined in claim 15 wherein the value and complement of each bit of the binary number are respectively connected to two further gates, the putputs of which are connected with the corresponding value line, or complement line of the common communications path and which can be opened by a control circuit in order to feed the binary number and its complement into the common communications path.

17. Apparatus as defined in claim 16 wherein the first gates and the further gates are AND gates.

18. Apparatus as defined in claim 16 wherein the first gates are NOR gates and the further gates are NAND gates.

19. Apparatus as defined in claim 15 and also including a storage device for storing the respective binary number and its complement in the functional unit.

* * * * *

UNITED STATES PATENT OFFICE
CERTIFICATE OF CORRECTION

Patent No. 3,863,225 Dated January 28, 1975

Inventor(s) Gunter Preiss

It is certified that error appears in the above-identified patent and that said Letters Patent are hereby corrected as shown below:

Col. 9, line 12, after "path 26" insert -- he state produced on the common communication path 26--

Col. 10, line 66, change "putput" to --output--

Col. 11, line 66, change "a < b" 2nd occurrence to --a > b--;

Claim 16, line 18, change "putput" to --output--

Signed and sealed this 29th day of April 1975.

(SEAL)
Attest:

RUTH C. MASON
Attesting Officer

C. MARSHALL DANN
Commissioner of Patents
and Trademarks

UNITED STATES PATENT OFFICE

CERTIFICATE OF CORRECTION

PATENT NO. : 3,863,225

DATED : January 28, 1975

INVENTOR(S) : Gunter Preiss

It is certified that error appears in the above-identified patent and that said Letters Patent are hereby corrected as shown below:

On the face of the patent insert:
--Foreign Application Priority Data
March 3, 1972 Germany P 22 10 426.3-53--

Signed and Sealed this

*second* Day of *March 1976*

[SEAL]

*Attest:*

RUTH C. MASON
*Attesting Officer*

C. MARSHALL DANN
*Commissioner of Patents and Trademarks*